(12) United States Patent
Kim et al.

(10) Patent No.: US 11,062,425 B2
(45) Date of Patent: Jul. 13, 2021

(54) ARITHMETIC PROCESSOR AND METHOD FOR OPERATING ARITHMETIC PROCESSOR

(71) Applicant: Samsung Electronics Co., Ltd., Suwon-si (KR)

(72) Inventors: Shin-gyu Kim, Seoul (KR); Chae-Seok Im, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 776 days.

(21) Appl. No.: 15/534,878

(22) PCT Filed: Nov. 27, 2015

(86) PCT No.: PCT/KR2015/012852
§ 371 (c)(1),
(2) Date: May 15, 2018

(87) PCT Pub. No.: WO2016/093521
PCT Pub. Date: Jun. 16, 2016

(65) Prior Publication Data
US 2020/0142755 A1 May 7, 2020

(30) Foreign Application Priority Data
Dec. 12, 2014 (KR) .................. 10-2014-0179357

(51) Int. Cl.
*G06F 9/46* (2006.01)
*G06T 3/40* (2006.01)
(Continued)

(52) U.S. Cl.
CPC .............. *G06T 3/4038* (2013.01); *G06F 9/52* (2013.01); *G06T 1/20* (2013.01); *G06T 11/203* (2013.01); *H04N 19/176* (2014.11)

(58) Field of Classification Search
CPC ....... G06T 3/4038; G06T 1/20; G06T 11/203; H04N 19/176; G06F 8/453; G06F 15/8023; G06F 9/52
See application file for complete search history.

(56) References Cited

U.S. PATENT DOCUMENTS 6,119,219 A 9/2000 Webb et al.
6,665,708 B1 12/2003 Tikekar et al.
(Continued)

FOREIGN PATENT DOCUMENTS

JP 2005-316679 A 11/2005
KR 10-1999-0082743 A 11/1999
(Continued)

OTHER PUBLICATIONS

Korean Office Action with English translation dated Sep. 28, 2020; Korean Appln. No. 10-2014-0179357.

*Primary Examiner* — Tuan A Vu
(74) *Attorney, Agent, or Firm* — Jefferson IP Law, LLP

(57) ABSTRACT

An operating method of a computing processor includes: performing a computing operation on a data unit assigned from among a plurality of data units that are partitioned from multi-media data; obtaining operation completion information of the computing operation performed on the data unit from among the plurality of data units, from at least one predetermined computing processor from among a plurality of computing processors; storing the operation completion information obtained from the at least one predetermined computing processor; and determining whether computing operations performed on the multi-media data have been completed, based on the operation completion information obtained from the at least one predetermined computing processor and stored, and the computing operation performed on the assigned data unit.

15 Claims, 9 Drawing Sheets

(51) Int. Cl.
*G06F 9/52* (2006.01)
*G06T 11/20* (2006.01)
*G06T 1/20* (2006.01)
H04N 19/176 (2014.01)

(56) References Cited

U.S. PATENT DOCUMENTS

| | | | |
|---|---|---|---|
| 8,453,149 B2 | 5/2013 | Ben Yehuda et al. | |
| 2007/0177177 A1* | 8/2007 | Murakami | G06T 11/203 358/1.13 |
| 2010/0218196 A1* | 8/2010 | Leung | G06F 8/453 718/107 |
| 2011/0057937 A1* | 3/2011 | Wu | G06F 15/8023 345/505 |
| 2011/0161965 A1 | 6/2011 | Im et al. | |
| 2012/0039383 A1* | 2/2012 | Huang | H04N 19/176 375/240.02 |
| 2012/0075314 A1* | 3/2012 | Malakapalli | G06T 1/20 345/522 |
| 2014/0078148 A1* | 3/2014 | Diard | G06T 3/4038 345/428 |

FOREIGN PATENT DOCUMENTS

| | | |
|---|---|---|
| KR | 10-2002-0088063 A | 11/2002 |
| KR | 10-2003-0050860 A | 6/2003 |
| KR | 10-2011-0075296 A | 7/2011 |

* cited by examiner

ARITHMETIC PROCESSOR AND METHOD FOR OPERATING ARITHMETIC PROCESSOR

TECHNICAL FIELD

The present inventive concept relates to computing processors and an operating method thereof.

BACKGROUND ART

As the amount of multi-media data that has to be processed by a computing processor has increased, a parallel method of processing the multi-media data has been used by using a multi-core processor including a plurality of computing processors. The multi-core processor processes the multi-media data by using a data partitioning method, that is, by partitioning the multi-media data and assigning the partitioned multi-media data to the plurality of computing processors.

The data partitioning method guarantees high parallelism with respect to simple data processing. However, when there is inter-dependence among data, it is difficult to implement the data partitioning method, and an additional operation is needed to solve the dependence, which radically degrades performance.

DETAILED DESCRIPTION OF THE INVENTION

Technical Problem

Embodiments disclosed herein relate to a computing processor configured to efficiently perform synchronization for computing operations among a plurality of computing processors to which partitioned multi-media data has been assigned, and an operating method of the computing processor.

Technical Solution

Provided is an operating method of a computing processor, the method including: performing a computing operation on a data unit assigned from among a plurality of data units that are partitioned from multi-media data; obtaining operation completion information of the computing operation performed on the data unit from among the plurality of data units, from at least one predetermined computing processor from among a plurality of computing processors; storing the operation completion information obtained from the at least one predetermined computing processor; and determining whether computing operations performed on the multi-media data have been completed, based on the operation completion information obtained from the at least one predetermined computing processor and stored, and the computing operation performed on the assigned data unit.

BEST MODE

Figure 1:
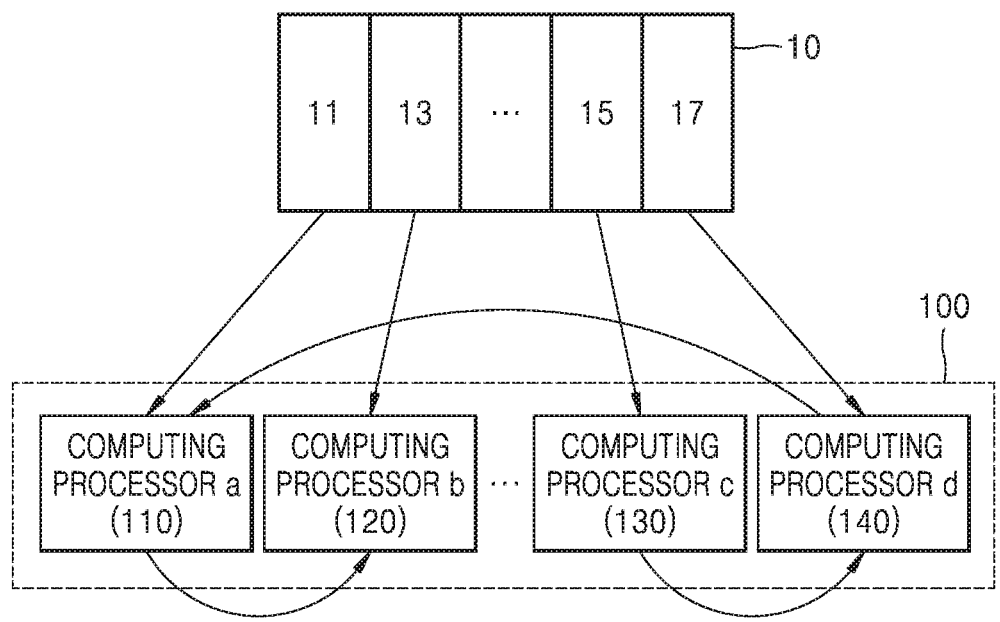
FIG. 1 is a conceptual view for describing an operating method of a multi-core processor, according to an embodiment.

According to an aspect of the present inventive concept, there is provided an operating method of a computing processor, the method including: performing a computing operation on a data unit assigned from among a plurality of data units that are partitioned from multi-media data; obtaining operation completion information of the computing operation performed on the data unit from among the plurality of data units, from at least one predetermined computing processor from among a plurality of computing processors; storing the operation completion information obtained from the at least one predetermined computing processor; and determining whether computing operations performed on the multi-media data have been completed, based on the operation completion information obtained from the at least one predetermined computing processor and stored, and the computing operation performed on the assigned data unit.

According to another aspect of the present inventive concept, there is provided a computing processor including: a controller configured to perform a computing operation on a data unit assigned from among a plurality of data units that are partitioned from multi-media data; an operation information transmitter and receiver configured to obtain operation completion information of the computing operation performed on the data unit from among the plurality of data units, from at least one predetermined computing processor from among a plurality of computing processors; and a memory configured to store operation completion information obtained from each of the plurality of computing processors, wherein the controller is further configured to determine whether computing operations performed on the multi-media data have been completed, based on the operation completion information obtained from the at least one predetermined computing processor and stored, and the computing operation performed on the assigned data unit.

MODE OF THE INVENTION

Hereinafter, the present inventive concept will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. In the drawings, like reference numerals denote like elements. Also, while describing the present inventive concept, detailed descriptions about related well known functions or configurations that may blur the points of the present inventive concept are omitted.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements. Hereinafter, the present inventive concept will be described in detail by referring to the accompanying drawings.

FIG. 1 is a conceptual view for describing an operating method of a multi-core processor 100, according to an embodiment.

For convenience of description of embodiments of the present inventive concept, a data unit used in this specification will be defined.

The multi-core processor 100 according to an embodiment may perform a computing operation on multi-media data based on a predetermined data processing unit. The data processing unit refers to a unit, such as a frame, a slice, a picture, etc., which is partitioned from the multi-media data based on a predetermined criterion. For example, the multi-core processor 100 may perform the computing operation based on a frame of the multi-media data.

A data unit refers to a partitioned portion of the data processing unit. When the data processing unit is partitioned into data units, a plurality of computing processors 110, 120, 130, and 140 may efficiently perform parallel computing operations on the data processing unit having a large amount of data. For example, when the data processing unit is a frame 10, the data units may be a plurality of slices 11, 13, 15, and 17 which are partitioned from the frame 10.

The multi-core processor 100 according to an embodiment may include the plurality of computing processors 110, 120, 130, and 140. By using a data partitioning method, the multi-core processor 100 may perform a computing operation on obtained multi-media data. For example, when the data partitioning method is used, the multi-core processor 100 may assign the plurality of slices 11, 13, 15, and 17 partitioned from the frame 10 to the plurality of computing processors 110, 120, 130, and 140, respectively, wherein the frame 10 is the data processing unit of the multi-media data.

Each of the plurality of computing processors 110, 120, 130, and 140 included in the multi-core processor 100 may perform various computing operations on an assigned data unit. For example, the computing processors 110, 120, 130, and 140 may perform data reading, entropy decoding, inverse-frequency conversion, dequantization, intra-prediction, motion compensation, etc. However, this is only an example embodiment, and the computing processors 110, 120, 130, and 140 may perform various computing operations, according to a function of the multi-core processor 100.

Meanwhile, for the multi-core processor 100 to perform the computing operation by using the data partitioning method, synchronization among the computing processors 110, 120, 130, and 140 may be required. For example, when the slices 11, 13, 15, and 17 partitioned from the frame 10 are assigned to the computing processors 110, 120, 130, and 140, a new frame 20 may be assigned to the computing processors 110, 120, 130, and 140 after all the computing processors 110, 120, 130, and 140 complete the computing operations performed on the first frame 10. For synchronization at the point in which the new frame 20 is assigned to the computing processors 110, 120, 130, and 140, the computing processors 110, 120, 130, and 140 may have to exchange information regarding whether the computing operations have been completed, among one another.

The computing processors 110, 120, 130, and 140 according to an embodiment may transmit and receive operation completion information indicating whether a computing operation performed on an assigned data unit has been completed, based on a predetermined rule. The computing processors 110, 120, 130, and 140 may transmit and receive the operation completion information to and from one another to identify that the computing operations of all the computing processors 110, 120, 130, and 140 included in the multi-core processor 100 have been completed. The predetermined rule will be described in detail later by referring to FIGS. 2 and 3.

Meanwhile, after a computing processor (for example, the computing processor 110) completes a computing operation performed on an assigned slice (for example, the slice 11), the computing processor (for example, the computing processor 110) may stand by until the computing processor (for example, the computing processor 110) receives the operation completion information of another computing processor (for example, the computing processor 120), without repeatedly checking whether the other computing processor (for example, the computing processor 120) has completed a computing operation. Since the computing processor (for example, the computing processor 110) may determine via the received operation completion information whether the other computing processor (for example, the computing processor 120) has completed the computing operation, without having to repeatedly check the same, the computing processor (for example, the computing processor 110) may use power efficiently.

Figure 2:
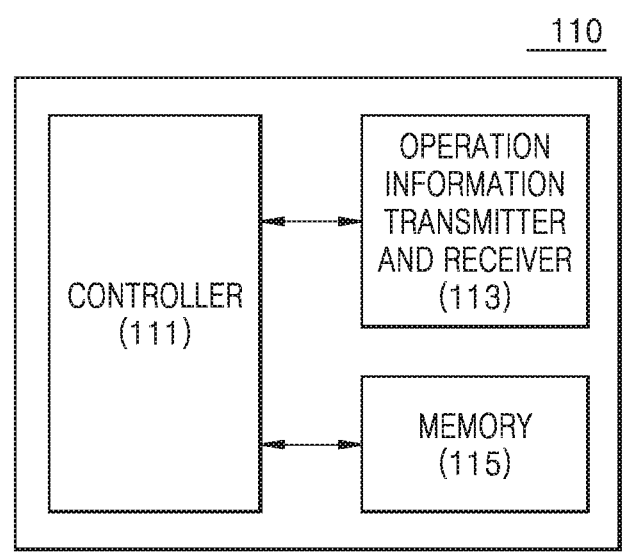
FIGS. 2 and 3 are block diagrams of a computing processor according to an embodiment.
Figure 3:
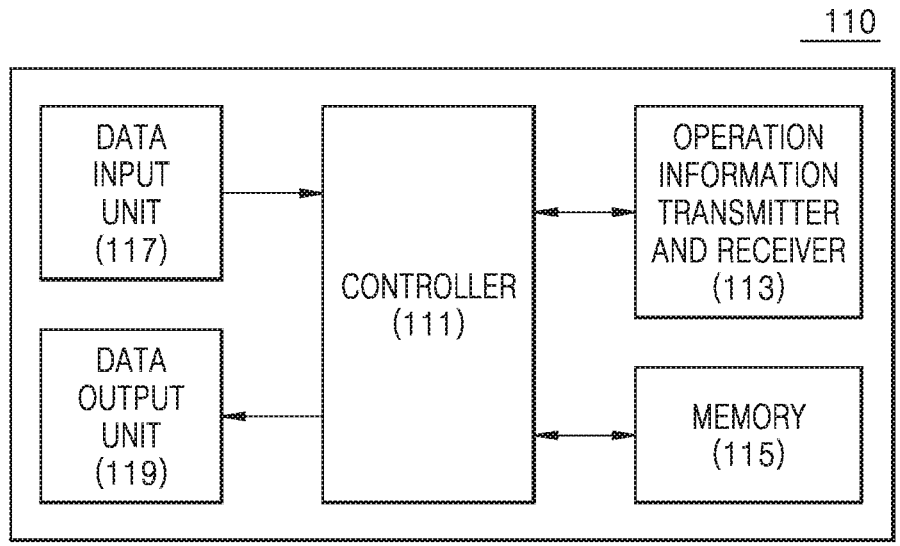

FIGS. 2 and 3 are block diagrams of the computing processor 110 according to an embodiment.

As shown in FIG. 2, the computing processor 110 according to an embodiment may include a controller 111, an operation information transmitter and receiver 113, and a memory 115. However, not all of the illustrated components are essential components. The computing processor 110 may be implemented by including more or less components than the illustrated components.

For example, as shown in FIG. 3, the computing processor 110 according to an embodiment may further include a data input unit 117 and a data output unit 119, in addition to the controller 111, the operation information transmitter and receiver 113, and the memory 115.

Hereinafter, the above components will be sequentially described.

The controller 111 may perform a computing operation on the assigned data unit 11 from among the plurality of data units 11, 13, 15, and 17 partitioned from the multi-media data. Here, the plurality of data units 11, 13, 15, and 17 may be respectively assigned to the plurality of computing processors 110, 120, 130, and 140 included in the multi-core processor 100 including the computing processor 110.

The controller 111 may determine whether computing operations of the other computing processors 120, 130, and 140 have been completed, by using operation completion information obtained from at least one predetermined computing processor (for example, the computing processor 120 or 130). Here, the operation completion information may include operation completion information of the computing processor (for example, the computing processor 120) transmitting the operation completion information. Also, the operation completion information may include operation completion information of the other computing processors (for example, the computing processor 140) included in the multi-core processor 100, in addition to the operation completion information of the computing processor (for example, the computing processor 130) transmitting the operation completion information.

Hereinafter, for convenience of explanation, the computing processor 110 will be described as computing processor a 110, and the other computing processors 120, 130, and 140 will be described as computing processor b 120, computing processor c 130, and computing processor d 140, respectively.

Also, although there are no orders among the plurality of computing processors 110, 120, 130, and 140, for description of the rule based on which the operation completion information is transmitted and received according to an embodiment, the computing processors 110, 120, 130, and 140 will be referred to as previous computing processors or next computing processors, based on one computing processor. For example, based on computing processor a 110, the previous computing processor may be computing processor d 140, and the next computing processor may be computing processor b 120.

The controller 111 may obtain the operation completion information from the at least one predetermined computing processor (for example, the computing processor 120), based on the rule determined in the multi-core processor 100. Here, the rule may exist in various forms. However, in this specification, it will be described that the controller 111 obtains the operation completion information from $2^{x-1th}$ previous computing processors based on computing processor a 110. Here, x may have a value from 0 to n, and the multi-core processor 100 may include computing processors, the number of which is any one of $2^{n-1}+1$ to $2^n$.

For example, when the multi-core processor 100 includes four computing processors 110, 120, 130, and 140, the controller 111 may obtain the operation completion information from the previous computing processor and the $2^{nd}$ previous computing processor, based on computing processor a 110. Also, the controller 111 may obtain the operation completion information from computing processor c 130 which is the $2^{nd}$ previous computing processor, based on computing processor a 110.

Meanwhile, based on the at least one predetermined computing processor (for example, the computing processor 120), the operation completion information transmitted to computing processor a 110 may vary. The operation completion information obtained from the $2^{x-1th}$ previous computing processor may include information regarding operations of the $2^{x-1th}$ previous computing processor to the $2^{x-1th}$ previous computing processor.

For example, when 2n computing processors are included in the multi-core processor 100, first operation completion information may indicate that a computing operation of the previous computing processor to the computing processor has been completed. Second operation completion information may indicate that operations of the $2^{1th}$ previous computing processor to the $2^2-1^{th}$ previous computing processor have been completed. Also, $n^{th}$ operation completion information may indicate that operations of the $2^{n-1th}$ previous computing processor to the computing processor to the $2^{n-1th}$ previous computing processor have been completed.

Referring to FIG. 1 described above, the first operation completion information that computing processor d 140, which is the previous computing processor to computing processor a 110, transmits to computing processor a 110, may indicate that the computing operation of computing processor d 140 has been completed. Also, the operation completion information that computing processor c 130, which is the second previous computing processor to computing processor a 110, transmits to computing processor a 110, may indicate that the computing operation of computing processor c 130, and the computing operation of computing processor b 120, which is the third previous computing processor to computing processor a 110, have been completed.

When $2^{n-1}+m$ computing processors are included in the multi-core processor 100, obtained first operation completion information may indicate that a computing operation of the previous computing processor to the computing processor has been completed. Also, obtained second operation completion information may indicate that operations of the $2^{1th}$ previous computing processor to the computing processor to the $2^2-1^{th}$ previous computing processor to the computing processor have been completed. Also, obtained $n^{th}$ operation completion information may indicate that operations of the $2^{n-1th}$ previous computing processor to the computing processor to the $2^n+m-1^{th}$ previous computing processor to the computing processor have been completed.

When the controller 110 according to an embodiment has received the operation completion information, the controller 110 may enter into a first mode for storing the operation completion information to the memory 115. Also, when the controller 110 has not received all the operation completion information with respect to the other data units 13, 15, and 17, the controller 110 may enter into a second mode for waiting to receive the operation completion information from another computing processor (for example, the computing processor 120).

When the computing operation performed on the assigned data unit has been completed, the controller 110 may generate the operation completion information indicating that the computing operation performed on the assigned data unit has been completed. Also, the controller 110 may generate the operation completion information indicating that the computing operation of another computing processor (for example, the computing processor 140) has been completed, based on the operation completion information obtained from the other computing processor (for example, the computing processor 140), which is predetermined in computing processor a 110. This aspect will be described in more detail by referring to FIGS. 4 through 7.

Meanwhile, the operation completion information may include information regarding an area of the memory 115, in which the operation completion information is to be stored.

The operation information transmitter and receiver 113 may receive the operation completion information indicating that the computing operation performed on at least one data unit from among the plurality of data units 11, 13, 15, and 17 has been completed, from at least one computing processor (for example, the computing processor 140) from among the plurality of computing processors 110, 120, 130, and 140. The operation completion information received by the operation information transmitter and receiver 113 may be stored in a predetermined location of the memory 115. Here, the location of the memory 115, in which the operation completion information is to be stored, may be predetermined based on the received operation completion information.

The operation information transmitter and receiver 113 may transmit the operation completion information indicating that the computing operation performed on the assigned data unit has been completed to another computing processor (for example, the computing processor 120). Also, the operation information transmitter and receiver 113 may transmit the operation completion information indicating that the computing operation of the predetermined other computing processor (for example, the computing processor 140) has been completed to the other computing processor (for example, the computing processor 130).

When $2^n$ computing processors are included in the multi-core processor 100, the operation information transmitter and receiver 113 may transmit first operation completion information indicating that the computing operation of computing processor a 110 has been completed to the next computing processor. Also, when the computing operation of computing processor a 110 has been completed, and the operation information transmitter and receiver 113 receives the operation completion information from the previous computing processor, the operation information transmitter and receiver 113 may transmit second operation completion information to $2^{1th}$ next computing processor. Also, when the computing operation of computing processor a 110 has been completed, and the operation information transmitter and receiver 113 receives the operation completion information from the computing processors including the previous computing processor to the $2^{n-1th}$ previous computing processor, the operation information transmitter and receiver 113 may transmit the $n^{th}$ operation completion information to the $2^{n-1th}$ next computing processor.

When the operation information transmitter and receiver 113 receives the operation completion information from the $2^{n-1th}$ previous computing processor and does not receive the operation completion information from the $2^{n-2th}$ previous computing processor, the operation information transmitter and receiver 113 may suspend the transmission of $n^{th}$ operation completion information, until the operation information transmitter and receiver 113 receives the operation completion information from the $2^{n-2th}$ previous computing processor.

According to another embodiment, when $2^{n-1}+m$ computing processors are included in the multi-core processor 100, the above method may be applied likewise.

The memory 115 may store the operation completion information obtained from at least one computing processor. The memory 115 according to an embodiment may be partitioned into a plurality of areas to store the operation completion information received from each of the plurality of computing processors. According to the area of the memory 115, in which the operation completion information is stored, the controller 111 may determine which computing processors from among the other computing processors 120, 130, and 140 included in the multi-core processor 100 have completed the computing operation.

The number of the plurality of areas of the memory 115 may be determined based on the number of computing processors 110, 120, 130, and 140 included in the multi-core processor 100. For example, when $2^n$ computing processors are included in the memory 115, n identifiable areas may be included in the memory 115. For example, when four computing processors 110, 120, 130, and 140 are included in the multi-core processor 100, the memory 115 may have two identifiable areas.

When the number of computing processors is $2^{n-1}+m$, the memory may also include n identifiable areas. For example, when there are six computing processors, three areas may be included in the memory 115.

The area of the memory 115 in which the operation completion information is to be stored may vary based on the computing processor transmitting the operation completion information to computing processor a 110. For example, when the memory 115 includes n areas, the operation completion information received from the previous computing processor may be stored in a first area of the memory 115. The operation completion information received from the $2^{1th}$ previous computing processor may be stored in a second area of the memory 115. The operation completion information received from the $2^{m-1th}$ previous computing processor may be stored in an $n^{th}$ area of the memory.

However, this is only an example embodiment, and the method of storing the operation completion information in the memory 115 may vary based on a user's setting.

When the operation completion information is stored in all areas included in the memory 115, and the computing operations performed on the assigned data units have been completed, the controller 111 may determine that the computing operations of all the computing processors 110, 120, 130, and 140 included in the multi-core processor 100 have been completed.

The data input unit 117 may obtain any one of the plurality of data units allocated from the multi-media data. When the computing operations performed on the allocated data units have been completed, the data input unit 117 may sequentially obtain any one of a plurality of data units allocated from next multi-media data.

When the computing operation performed on the data unit assigned to computing processor a 110 has been completed, and the computing operations of the other computing processors 120, 130, and 140 included in the multi-core processor 100 have been completed, the data output unit 119 may output a result of the computing operations performed on the assigned data units.

Figure 4:
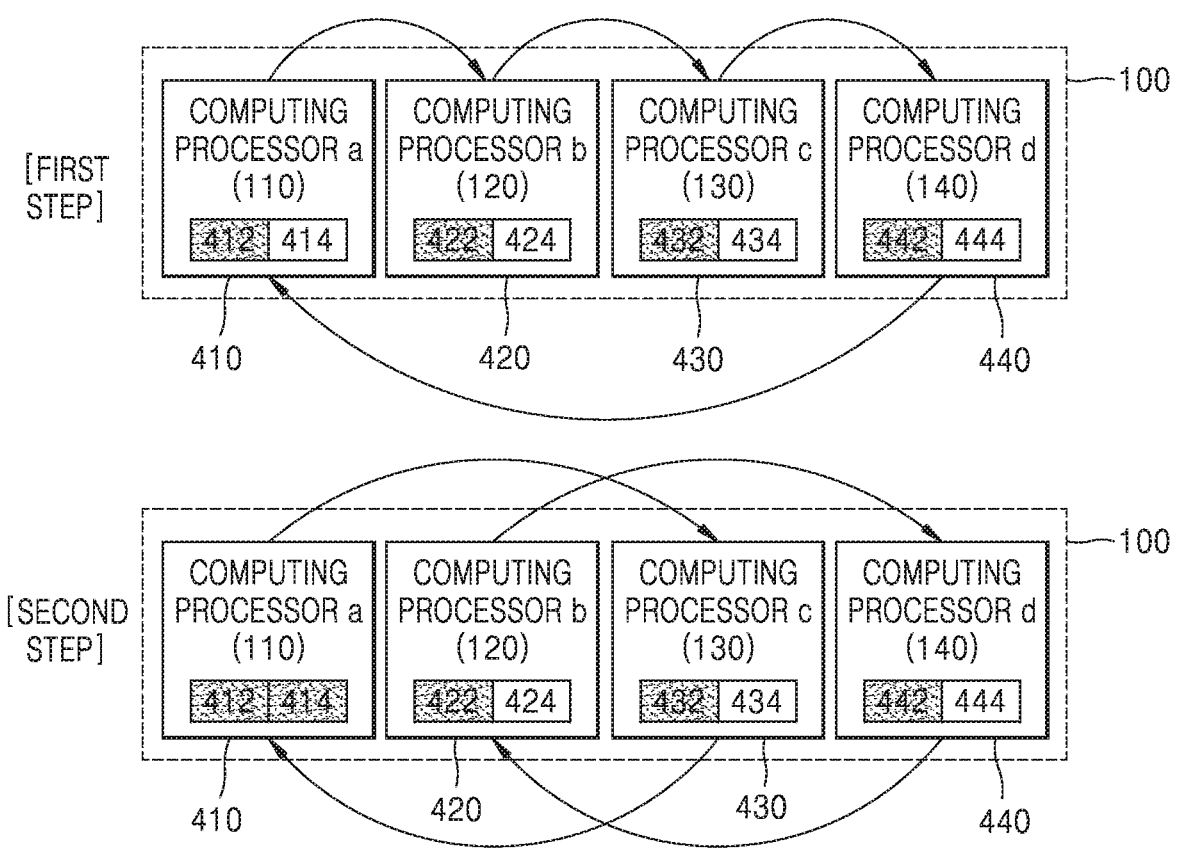
FIG. 4 is a view for describing a method of transmitting and receiving operation completion information among a plurality of computing processors included in a multi-core processor, according to an embodiment.

FIG. 4 is a view for describing a method of transmitting and receiving operation completion information among the plurality of computing processors 110, 120, 130, and 140 included in the multi-core processor 100, according to an embodiment.

Referring to FIG. 4, the method of transmitting and receiving the operation completion information among the plurality of computing processors 110, 120, 130, and 140 may be performed in two steps. Also, $2^2$ computing processors 110, 120, 130, and 140 included in the multi-core processor 100 may include memories 410, 420, 430, and 440 each having two areas that are identifiable according to the step of the method of transmitting and receiving the operation completion information.

Also, the operation completion information transmitted and received according to the steps may include operation completion information of different computing processors, based on the step. For example, first operation completion information transmitted and received in the first step may indicate that the computing operation of the previous computing processor transmitting the first operation completion information has been completed. Also, second operation completion information transmitted and received in the second step may indicate that the computing operations of the previous computing processor to the $2^2-1^{th}$ previous computing processor have been completed.

Hereinafter, the method of transmitting and receiving the operation completion information among computing processor a 110, computing processor b 120, computing processor c 130, and computing processor d 140 will be described in detail by referring to FIG. 4.

In the first step, each of computing processor a 110, computing processor b 120, computing processor c 130, and computing processor d 140 may transmit the first operation completion information to the next computing processor, when each of computing processor a 110, computing processor b 120, computing processor c 130, and computing processor d 140 completes the computing operation performed on the assigned data unit. The operation completion information may include an identification value of a location in which the operation completion information is to be stored.

For example, when the computing operation on the assigned data unit has been completed, computing processor a 110 may transmit the first operation completion information to computing processor b 120. Computing processor b 120 may store the received first operation completion information to a first area 422 of the memory 420 included in computing processor b 120. Computing processor b 120 may identify that the computing operation performed on the data unit assigned to computing processor a 110 has been completed, by using the first operation completion information stored to the first area 422 of the memory 420.

Also, when the computing operation performed on the assigned data unit has been completed, computing processor b 120 may transmit the first operation completion information to computing processor c 130. Computing processor c 130 may store the received first operation completion information to a first area 432 of the memory 430 included in computing processor c 130. Computing processor c 130 may identify that the computing operation performed on the data unit assigned to computing processor b 120 has been completed, by using the first operation completion information stored to the first area 432 of the memory 430.

When the computing operation performed on the assigned data unit has been completed, computing processor c 130 may transmit the first operation completion information to computing processor d 140. Computing processor d 140 may store the received first operation completion information to a first area 442 of the memory 440 included in computing processor d 140. Computing processor d 140 may identify that the computing operation performed on the data unit assigned to computing processor c 130 has been completed, by using the first operation completion information stored to the first area 442 of the memory 440.

When the computing operation performed on the assigned data unit has been completed, computing processor d 140 may transmit the first operation completion information to computing processor a 110. Computing processor a 110 may store the received first operation completion information to a first area 412 of the memory 410 included in computing processor a 110. Computing processor a 110 may identify that the computing operation performed on the data unit assigned to computing processor d 140 has been completed, by using the first operation completion information stored to the first area 412 of the memory 410.

In the second step, when each of computing processor a 110, computing processor b 120, computing processor c 130, and computing processor d 140 has completed the computing operation performed on the assigned data unit, and has received the operation completion information from the previous processor, each of computing processor a 110, computing processor b 120, computing processor c 130, and computing processor d 140 may transmit the second operation completion information to the $2^{nd}$ next computing processor. The operation completion information may include an identification value of a location in which the operation completion information is to be stored.

For example, when the computing operation on the assigned data unit has been completed, and computing processor a 110 receives the first operation completion information from computing processor d 140, computing processor a 110 may transmit the second operation completion information to computing processor c 130. Computing processor c 130 may store the received second operation completion information to a second area 434 of the memory 430 included in computing processor c 130. Computing processor c 130 may identify that the computing operations of computing processor a 110 and computing processor d 140 have been completed, by using the second operation completion information stored to the second area 434 of the memory 430.

Also, when the computing operation on the assigned data unit has been completed, and computing processor b 120 receives the first operation completion information from computing processor a 110, computing processor b 120 may transmit the second operation completion information to computing processor d 140. Computing processor d 140 may store the received second operation completion information to a second area 444 of the memory 440 included in computing processor d 140. Computing processor d 140 may identify that the computing operations of computing processor b 120 and computing processor a 110 have been completed, by using the second operation completion information stored to the second area 444 of the memory 440.

When the computing operation on the assigned data unit has been completed, and computing processor c 130 receives the first operation completion information from computing processor b 120, computing processor c 130 may transmit the second operation completion information to computing processor a 110. Computing processor a 110 may store the received second operation completion information to a second area 414 of the memory 410 included in computing processor a 110. Computing processor a 110 may identify that the computing operations of computing processor c 130 and computing processor b 120 have been completed, by using the second operation completion information stored to the second area 414 of the memory 410.

When the computing operation on the assigned data unit has been completed, and computing processor d 140 receives the first operation completion information from computing processor c 130, computing processor d 140 may transmit the second operation completion information to computing processor b 120. Computing processor b 120 may store the received second operation completion information to a second area 424 of the memory 420 included in computing processor b 120. Computing processor b 120 may identify that the computing operations of computing processor d 140 and computing processor c 130 have been completed, by using the second operation completion information stored to the second area 424 of the memory 420.

Each of the plurality of computing processors 110, 120, 130, and 140 may perform the two steps of transmitting and receiving the operation completion information, and then, may identify that the computing operations of all the computing processors 110, 120, 130, and 140 included in the multi-core processor 100 have been completed, by using the operation completion information stored to the first and second areas of the memories 410, 420, 430, and 440.

The multi-core processor 100 according to an embodiment may identify that all operations performed on the data units partitioned from the multi-media data have been completed, by using the method of transmitting and receiving the operation completion information among the plurality of computing processors 110, 120, 130, and 140 included in the multi-core processor 100.

FIGS. 5A through 5E are views for describing in detail a method of transmitting and receiving operation completion information among the plurality of computing processors 110, 120, 130, and 140 included in the multi-core processor 100 based on the order in which computing operations are completed by the computing processors 110, 120, 130, and 140, according to an embodiment.

For convenience of explanation, it is assumed that the computing operations are completed in the order of computing processor d 140, computing processor c 130, computing processor b 120, and computing processor a 110.

Figure 5A:
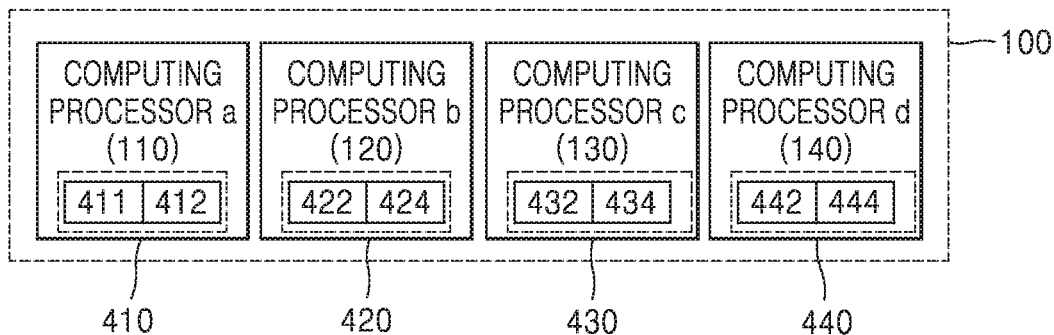
FIGS. 5A through 5E are views for describing in detail a method of transmitting and receiving operation completion information among a plurality of computing processors included in a multi-core processor, based on the order in which computing operations are completed by the plurality of computing processors, according to an embodiment.

Referring to FIG. 5A, the memories 410, 420, 430, and 440 included in the plurality of computing processors 110, 120, 130, and 140 are initialized. Each of the plurality of computing processors 110, 120, 130, and 140 may perform the computing operation performed on the assigned data unit.

Figure 5B:
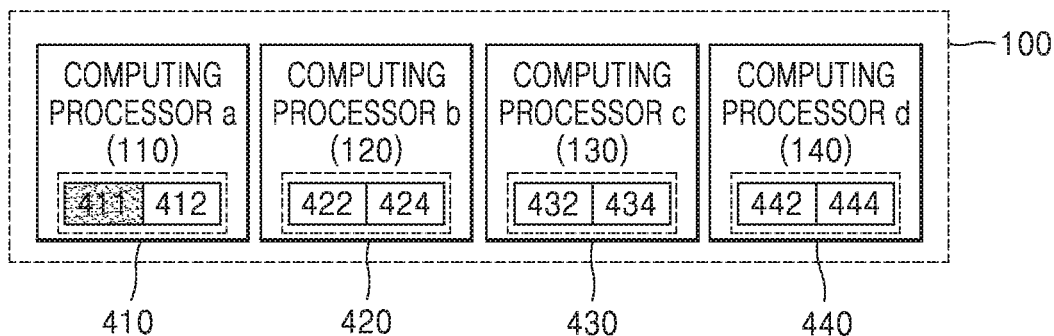

Referring to FIG. 5B, when the computing operation has been completed, computing processor d 140 may transmit the first operation completion information to the next computing processor, computing processor a 110. Computing processor a 110 may store the received first operation completion information to the first area 412 of the memory 410.

Figure 5C:
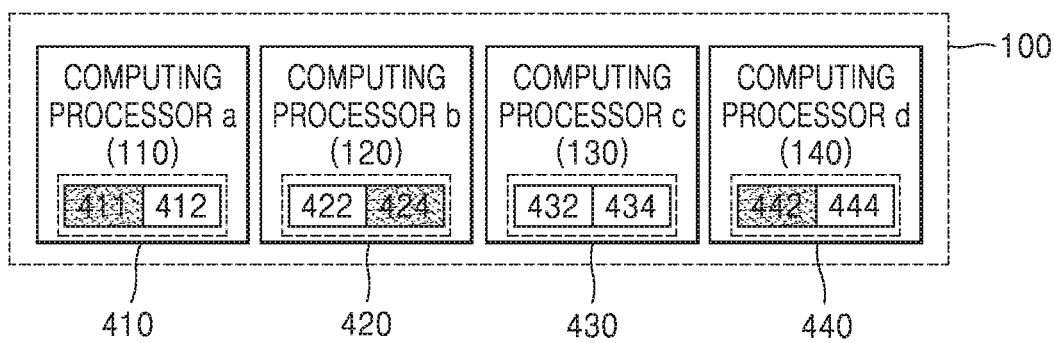

Referring to FIG. 5C, when the computing operation has been completed, computing processor c 130 may transmit the first operation completion information to the next computing processor, computing processor d 140. Computing processor d 140 may store the received first operation completion information to the first area 442 of the memory 440.

Computing processor d 140 has completed the computing operation performed on the assigned data unit and the first area 442 of the memory 440 of computing processor d 140 stores the operation completion information. Thus, computing processor d 140 may transmit the second operation completion information to the $2^{nd}$ next computing processor, computing processor b 120. Computing processor b 120 may store the received second operation completion information to the second area 424 of the memory 420.

Figure 5D:
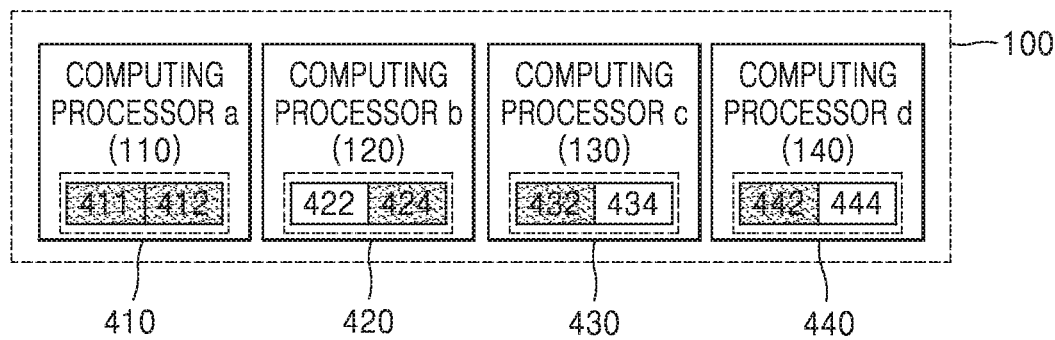

Referring to FIG. 5D, when the computing operation has been completed, computing processor b 120 may transmit the first operation completion information to the next computing processor, computing processor c 130. Computing processor c 130 may store the received first operation completion information to the first area 432 of the memory 430.

Figure 5E:
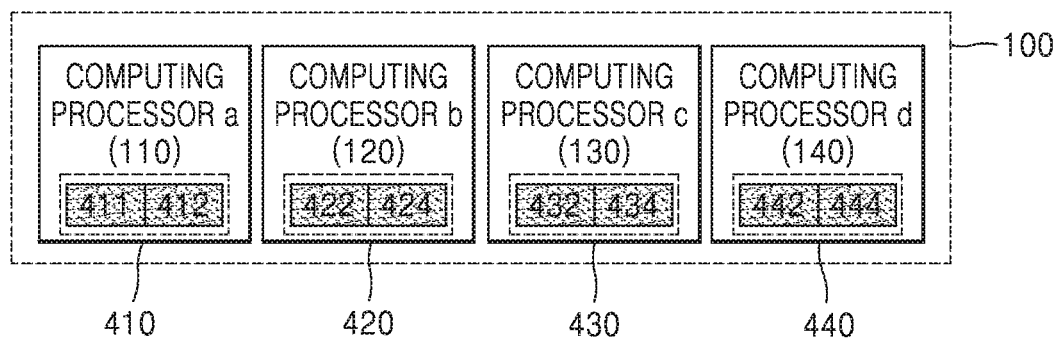

Referring to FIG. 5E, when the computing operation has been completed, computing processor a 110 may transmit the first operation completion information to the next computing processor, computing processor b 120. Computing processor b 120 may store the received first operation completion information to the first area 422 of the memory 420.

Computing processor a 110 has completed the computing operation performed on the assigned data unit, and the first area 412 of the memory 410 of computing processor a 110 stores the operation completion information. Thus, computing processor a 110 may transmit the second operation completion information to the $2^{nd}$ next computing processor, computing processor c 130. Computing processor c 130 may store the received second operation completion information to the second area 434 of the memory 430.

Computing processor b 120 has completed the computing operation performed on the assigned data unit, and the first area 422 of the memory 420 of computing processor b 120 stores the operation completion information since the computing operation of computing processor a 110 has been completed. Thus, computing processor b 120 may transmit the second operation completion information to the $2^{nd}$ next computing processor, computing processor d 140. Computing processor d 140 may store the received second operation completion information to the second area 444 of the memory 440.

When the computing operation performed on the assigned data, which is the final operation, has been completed by computing processor a 110, the operation completion information may be stored in the areas 411, 412, 422, 424, 432, 434, 442, and 444 of the memories 410, 420, 430, and 440 of all the processors 110, 120, 130, and 140. Each of the computing processors 110, 120, 130, and 140 may identify that the computing operations of the other computing processors have been completed by using the operation completion information stored in each memory 410, 420, 430, or 440.

Figure 6:
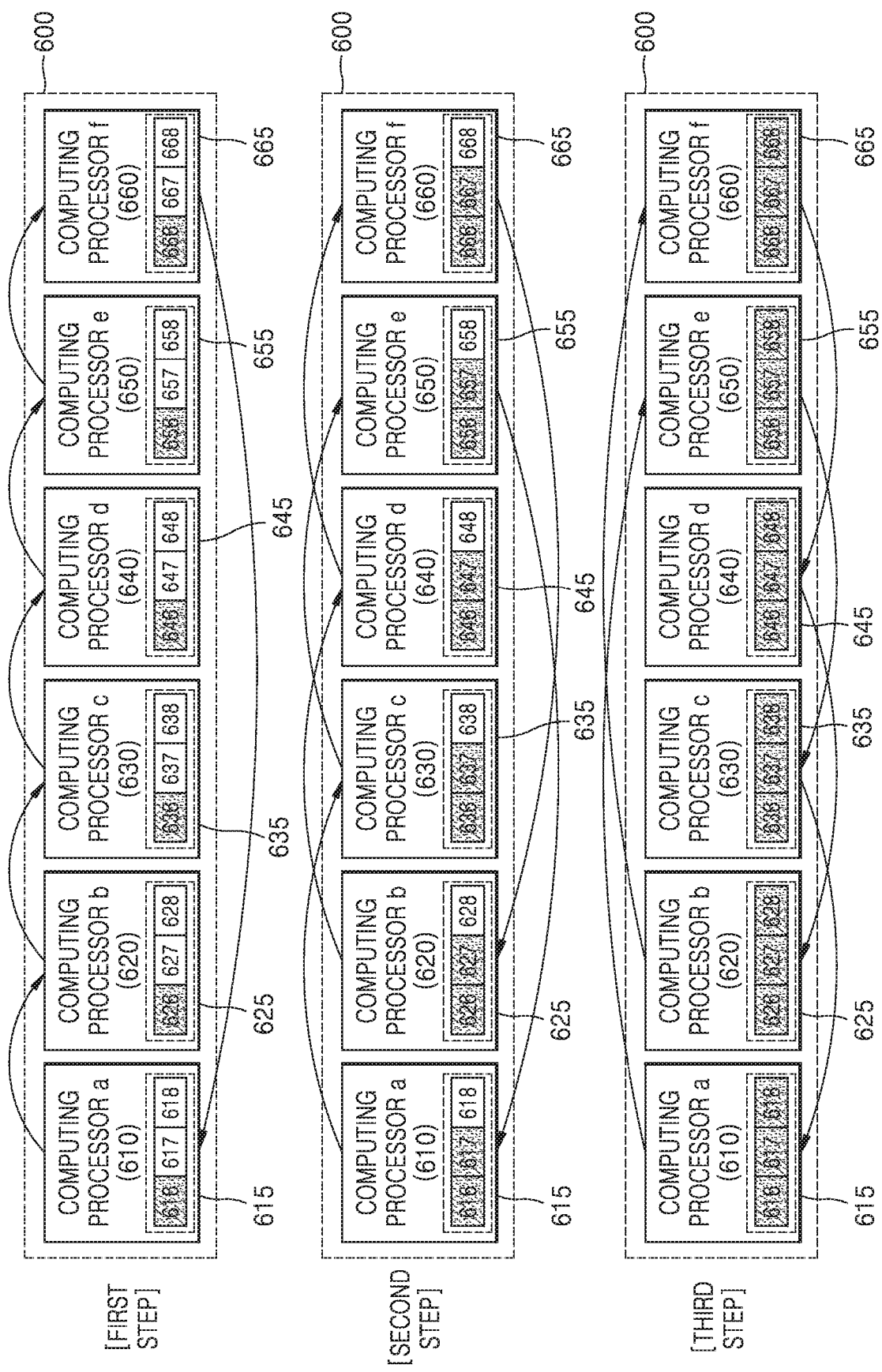
FIG. 6 is a view for describing a method of transmitting and receiving operation completion information among a plurality of computing processors included in a multi-core processor, according to another embodiment.

FIG. 6 is a view for describing a method of transmitting and receiving operation completion information among a plurality of computing processors 610, 620, 630, 640, 650, and 660 included in a multi-core processor 600, according to another embodiment.

Referring to FIG. 6, the method of transmitting and receiving the operation completion information among the plurality of computing processors 610, 620, 630, 640, 650, and 660 may include three steps. $2^2$+2 computing processors 610, 620, 630, 640, 650, and 660 included in the multi-core processor 600 may include memories 615, 625, 635, 645, 655, and 665 each having three identifiable areas according to the number of steps included in the operation completion information.

Also, the operation completion information stored according to the steps may include operation completion information of different computing processors, based on the step. For example, first operation completion information stored in the first step may indicate that the computing operation of the previous computing processor transmitting the first operation completion information has been completed. Also, second operation completion information stored in the second step may indicate that the computing operations of the previous computing processor transmitting the second operation completion information to the $2^2-1^{th}$ previous computing processor have been completed.

Third operation completion information stored in the third step may indicate that the computing operations of the $2^{2th}$ previous computing processor transmitting the third operation completion information to the $2^2+1^{th}$ previous computing processor have been completed.

Hereinafter, the method of transmitting and receiving the operation completion information among computing processor a 610, computing processor b 620, computing processor c 630, computing processor d 640, computing processor e 650, and computing processor f 660 will be described in detail by referring to FIG. 6.

In the first step, each of computing processor a 610, computing processor b 620, computing processor c 630, computing processor d 640, computing processor e 650, and computing processor f 660 may transmit the first operation completion information to the next computing processor, when each of computing processor a 610, computing processor b 620, computing processor c 630, computing processor d 640, computing processor e 650, and computing processor f 660 completes the computing operation performed on the assigned data unit. The operation completion information may include an identification value of a location in which the operation completion information is to be stored.

For example, when the computing operation on the assigned data unit has been completed, computing processor a 610 may transmit the first operation completion information to computing processor b 620. Computing processor b 620 may store the received first operation completion information to a first area 626 of a memory 625 included in computing processor b 620. Computing processor b 620 may identify that the computing operation performed on the data unit assigned to computing processor a 610 has been completed, by using the first operation completion information stored to the first area 626 of the memory 625.

Also, when the computing operation performed on the assigned data unit has been completed, computing processor b 620 may transmit the first operation completion information to computing processor c 630. Computing processor c 630 may store the received first operation completion information to a first area 636 of a memory 635 included in computing processor c 630. Computing processor c 630 may identify that the computing operation performed on the data unit assigned to computing processor b 620 has been completed, by using the first operation completion information stored to the first area 636 of the memory 635.

When the computing operation performed on the assigned data unit has been completed, computing processor c 630 may transmit the first operation completion information to computing processor d 640. Computing processor d 640 may store the received first operation completion information to a first area 646 of a memory 645 included in computing processor d 640. Computing processor d 640 may identify that the computing operation performed on the data unit assigned to computing processor c 630 has been completed, by using the first operation completion information stored to the first area 646 of the memory 645.

When the computing operation performed on the assigned data unit has been completed, computing processor d 640 may transmit the first operation completion information to computing processor e 650. Computing processor e 650 may store the received first operation completion information to a first area 656 of a memory 655 included in computing processor e 650. Computing processor e 650 may identify that the computing operation performed on the data unit assigned to computing processor d 640 has been completed, by using the first operation completion information stored to the first area 656 of the memory 655.

When the computing operation performed on the assigned data unit has been completed, computing processor e 650 may transmit the first operation completion information to computing processor f 660. Computing processor f 660 may store the received first operation completion information to a first area 666 of a memory 665 included in computing processor f 660. Computing processor f 660 may identify that the computing operation performed on the data unit assigned to computing processor e 650 has been completed, by using the first operation completion information stored to the first area 666 of the memory 665.

When the computing operation performed on the assigned data unit has been completed, computing processor f 660 may transmit the first operation completion information to computing processor a 610. Computing processor a 610 may store the received first operation completion information to a first area 616 of a memory 615 included in computing processor a 610. Computing processor a 610 may identify that the computing operation performed on the data unit assigned to computing processor f 660 has been completed, by using the first operation completion information stored to the first area 616 of the memory 615.

In the second step, when each of computing processor a 610, computing processor b 620, computing processor c 630, computing processor d 640, computing processor e 650, and computing processor f 660 has completed the computing operation performed on the assigned data unit, and has received the operation completion information from the previous processor, each of computing processor a 610, computing processor b 620, computing processor c 630, computing processor d 640, computing processor e 650, and computing processor f 660 may transmit the second operation completion information to the $2^{nd}$ next computing processor. The operation completion information may include an identification value of a location in which the operation completion information is to be stored.

For example, when the computing operation has been completed on the assigned data unit, and computing processor a 610 receives the first operation completion information from computing processor f 660, computing processor a 610 may transmit the second operation completion information to computing processor c 630. Computing processor c 630 may store the received second operation completion information to a second area 637 of the memory 635 included in computing processor c 630. Computing processor c 630 may identify that the computing operations of computing processor a 610 and computing processor f 660 have been completed, by using the second operation completion information stored to the second area 637 of the memory 635.

Also, when the computing operation on the assigned data unit has been completed, and computing processor b 620 receives the first operation completion information from computing processor a 610, computing processor b 620 may transmit the second operation completion information to computing processor d 640. Computing processor d 640 may store the received second operation completion information to a second area 647 of the memory 645 included in computing processor d 640. Computing processor d 640 may identify that the computing operations of computing processor b 620 and computing processor a 610 have been completed, by using the second operation completion information stored to the second area 647 of the memory 645.

When the computing operation on the assigned data unit has been completed, and computing processor c 630 receives the first operation completion information from computing processor b 620, computing processor c 630 may transmit the second operation completion information to computing processor e 650. Computing processor e 650 may store the received second operation completion information to a second area 657 of the memory 655 included in computing processor e 650. Computing processor e 650 may identify that the computing operations of computing processor c 630 and computing processor b 620 have been completed, by using the second operation completion information stored to the second area 657 of the memory 655.

When the computing operation on the assigned data unit has been completed, and computing processor d 640 receives the first operation completion information from computing processor c 630, computing processor d 640 may transmit the second operation completion information to computing processor f 660. Computing processor f 660 may store the received second operation completion information to a second area 667 of the memory 665 included in computing processor f 660. Computing processor f 660 may identify that the computing operations of computing processor d 640 and computing processor c 630 have been completed, by using the second operation completion information stored to the second area 667 of the memory 665.

When the computing operation on the assigned data unit has been completed, and computing processor e 650 receives the first operation completion information from computing processor d 640, computing processor e 650 may transmit the second operation completion information to computing processor a 610. Computing processor a 610 may store the received second operation completion information to a second area 617 of the memory 615 included in computing processor a 610. Computing processor a 610 may identify that the computing operations of computing processor e 650 and computing processor d 640 have been completed, by using the second operation completion information stored to the second area 617 of the memory 615.

When the computing operation on the assigned data unit has been completed, and computing processor f 660 receives the first operation completion information from computing processor e 650, computing processor f 660 may transmit the second operation completion information to computing processor b 620. Computing processor b 620 may store the received second operation completion information to a second area 627 of the memory 625 included in computing processor b 620. Computing processor b 620 may identify that the computing operations of computing processor f 660 and computing processor e 650 have been completed, by using the second operation completion information stored to the second area 627 of the memory 625.

In the third step, when each of computing processor a 610, computing processor b 620, computing processor c 630, computing processor d 640, computing processor e 650, and computing processor f 660 has completed the computing operation performed on the assigned data unit, and has received the first and second operation completion information from the previous processor and the second previous computing processor, respectively, each of computing processor a 610, computing processor b 620, computing processor c 630, computing processor d 640, computing processor e 650, and computing processor f 660 may transmit the third operation completion information to the $4^{th}$ next computing processor. The operation completion information may include an identification value of a location in which the operation completion information is to be stored.

For example, when the computing operation on the assigned data unit has been completed, and computing processor a 610 receives the first operation completion information from computing processor f 660 and the second operation completion information from computing processor e 650, computing processor a 610 may transmit the third operation completion information to computing processor e 650. Computing processor e 650 may store the received third operation completion information to a third area 658 of the memory 655 included in computing processor e 650. Computing processor e 650 may identify that the computing operations of computing processor a 610 and computing processor f 660 have been completed, by using the third operation completion information stored to the third area 658 of the memory 655.

When the computing operation on the assigned data unit has been completed, and computing processor b 620 receives the first operation completion information from computing processor a 610 and the second operation completion information from computing processor f 660, computing processor b 620 may transmit the third operation completion information to computing processor f 660. Computing processor f 660 may store the received third operation completion information to a third area 668 of the memory 665 included in computing processor f 660. Computing processor f 660 may identify that the computing operations of computing processor b 620 and computing processor a 610 have been completed, by using the third operation completion information stored to the third area 668 of the memory 665.

When the computing operation on the assigned data unit has been completed, and computing processor c 630 receives the first operation completion information from computing processor b 620 and the second operation completion information from computing processor a 610, computing processor c 630 may transmit the third operation completion information to computing processor a 610. Computing processor a 610 may store the received third operation completion information to a third area 618 of the memory 615 included in computing processor a 610. Computing processor a 610 may identify that the computing operations of computing processor c 630 and computing processor b 620 have been completed, by using the third operation completion information stored to the third area 618 of the memory 615.

When the computing operation on the assigned data unit has been completed, and computing processor d 640 receives the first operation completion information from computing processor c 630 and the second operation completion information from computing processor b 620, computing processor d 640 may transmit the third operation completion information to computing processor b 620. Computing processor b 620 may store the received third operation completion information to a third area 628 of the memory 625 included in computing processor b 620. Computing processor b 620 may identify that the computing operations of computing processor d 640 and computing processor c 630 have been completed, by using the third operation completion information stored to the third area 628 of the memory 625.

When the computing operation on the assigned data unit has been completed, and computing processor e 650 receives the first operation completion information from computing processor d 640 and the second operation completion information from computing processor c 630, computing processor e 650 may transmit the third operation completion information to computing processor c 630. Computing processor c 630 may store the received third operation completion information to a third area 638 of the memory 635 included in computing processor c 630. Computing processor c 630 may identify that the computing operations of computing processor e 650 and computing processor d 640 have been completed, by using the third operation completion information stored to the third area 638 of the memory 635.

When the computing operation on the assigned data unit has been completed, and computing processor f 660 receives the first operation completion information from computing processor e 650 and the second operation completion information from computing processor d 640, computing processor f 660 may transmit the third operation completion information to computing processor d 640. Computing processor d 640 may store the received third operation completion information to a third area 648 of the memory 645 included in computing processor d 640. Computing processor d 640 may identify that the computing operations of computing processor f 660 and computing processor e 650 have been completed, by using the third operation completion information stored to the third area 648 of the memory 645.

FIGS. 7A through 7G are views for describing in detail a method of transmitting and receiving operation completion information among the plurality of computing processors 610, 620, 630, 640, 650, and 660 included in the multi-core processor 600 based on the order in which the computing processors 610, 620, 630, 640, 650, and 660 complete computing operations, according to an embodiment.

For convenience of explanation, it is assumed that the computing operations are completed in the order of computing processor f 660, computing processor e 650, computing processor d 640, computing processor c 630, computing processor b 620, and computing processor a 610.

Figure 7A:
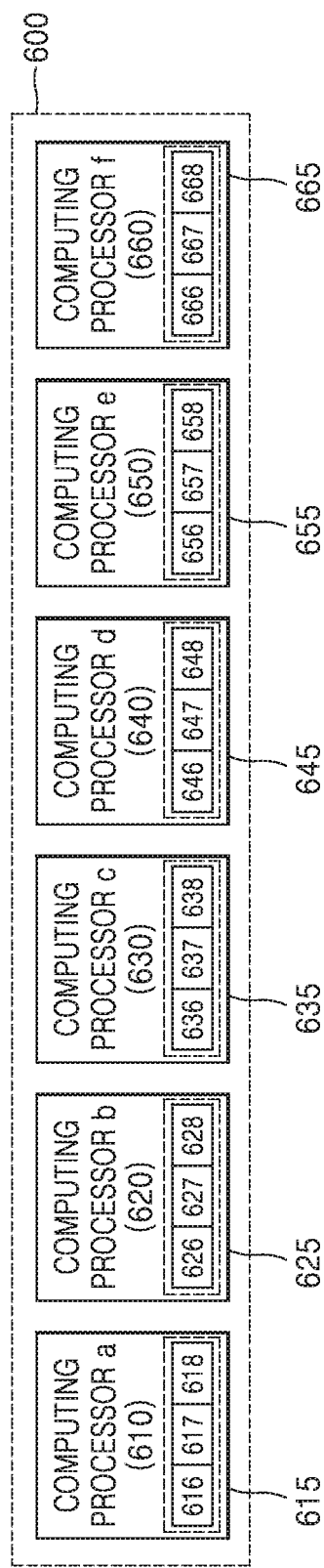
FIGS. 7A through 7G are views for describing in detail a method of transmitting and receiving operation completion information among a plurality of computing processors included in a multi-core processor, based on the order in which computing operations are completed by the plurality of computing processors, according to an embodiment.

Referring to FIG. 7A, the memories 615, 625, 635, 645, 655, and 665 included in the plurality of computing processors 610, 620, 630, 640, 650, and 660, respectively, are initialized. Each of the plurality of computing processors 610, 620, 630, 640, 650, and 660 may perform the computing operation on the assigned data unit.

Figure 7B:
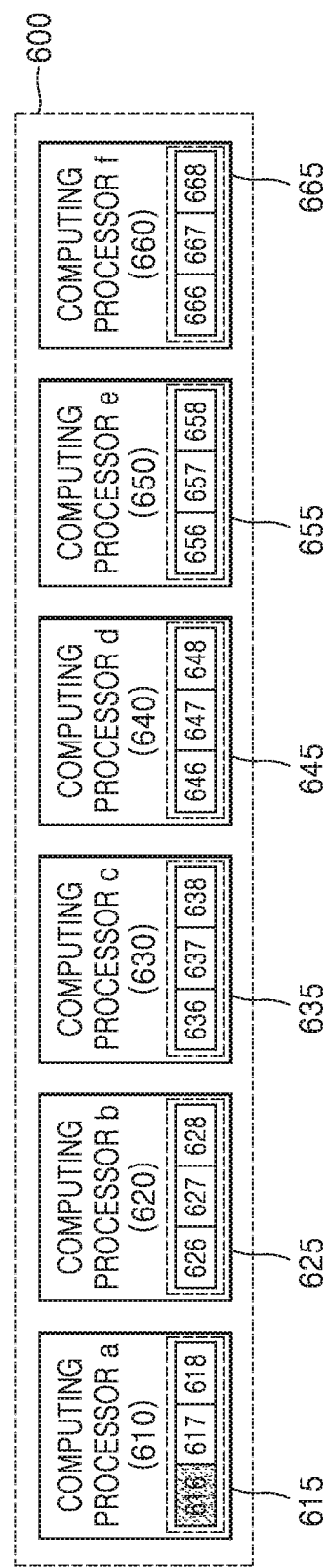

Referring to FIG. 7B, when the computing operation has been completed, computing processor f 660 may transmit the first operation completion information to the next computing processor, computing processor a 610. Computing processor a 610 may store the received first operation completion information to the first area 616 of the memory 615.

Figure 7C:
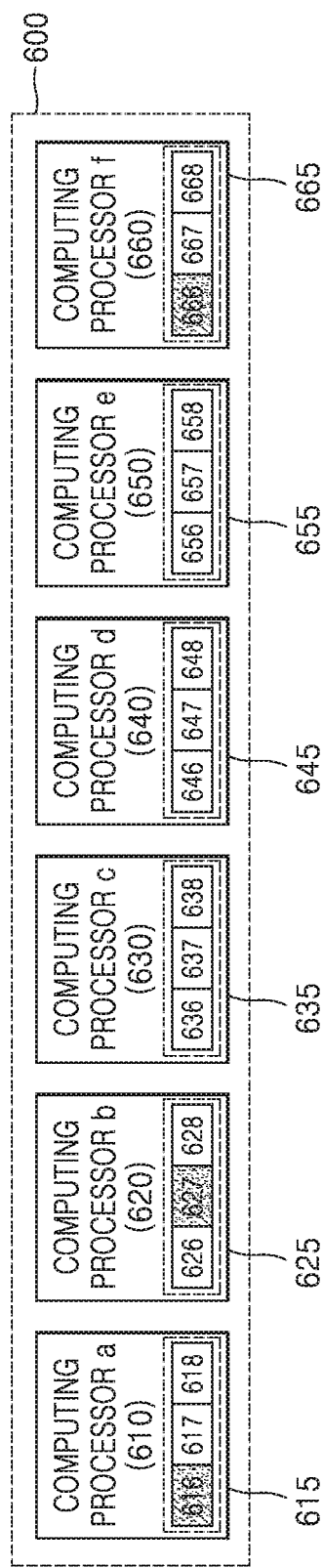

Referring to FIG. 7C, when the computing operation has been completed, computing processor e 650 may transmit the first operation completion information to the next computing processor, computing processor f 660. Computing processor f 660 may store the received first operation completion information to the first area 666 of the memory 665.

Computing processor f 660 has completed the computing operation performed on the assigned data unit and the first area 666 of the memory 665 of computing processor f 660 stores the operation completion information. Thus, computing processor f 660 may transmit the second operation completion information to the $2^{nd}$ next computing processor, computing processor b 620. Computing processor b 620 may store the received second operation completion information to the second area 627 of the memory 625.

Figure 7D:
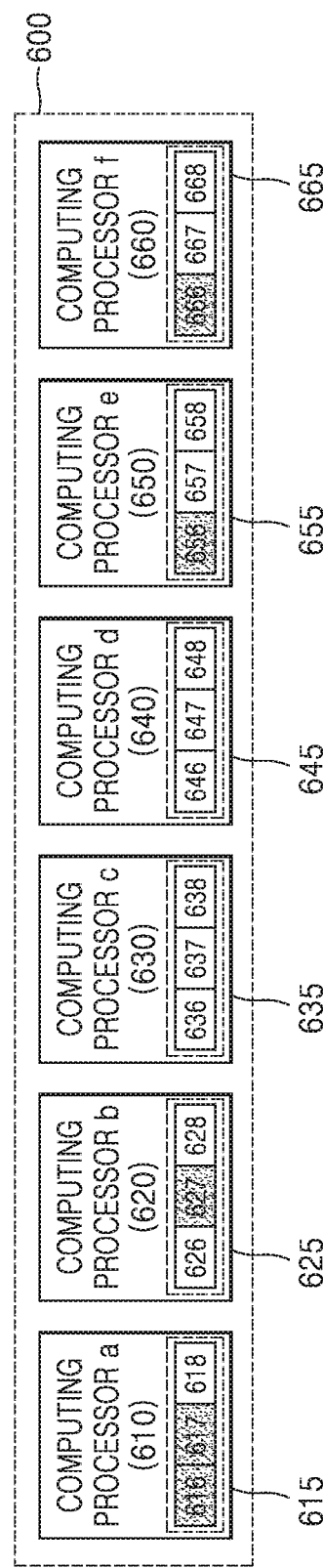

Referring to FIG. 7D, when the computing operation has been completed, computing processor d 640 may transmit the first operation completion information to the next computing processor, computing processor e 650. Computing processor e 650 may store the received first operation completion information to the first area 656 of the memory 655.

Computing processor e 650 has completed the computing operation performed on the assigned data unit and the first area 656 of the memory 655 of computing processor e 650 stores the operation completion information. Thus, computing processor e 650 may transmit the second operation completion information to the $2^{nd}$ next computing processor, computing processor a 610. Computing processor a 610 may store the received second operation completion information to the second area 617 of the memory 615.

Figure 7E:
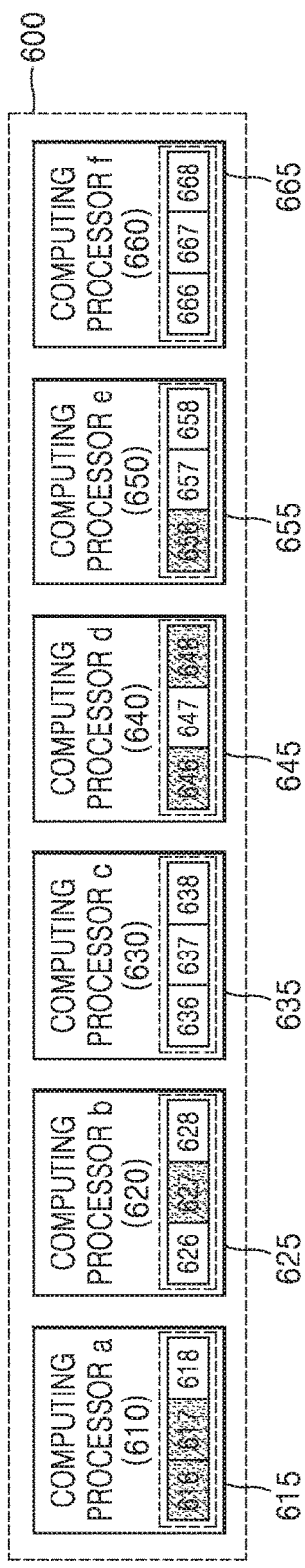

Referring to FIG. 7E, when the computing operation has been completed, computing processor c 630 may transmit the first operation completion information to the next computing processor, computing processor d 640. Computing processor d 640 may store the received first operation completion information to the first area 646 of the memory 645.

Computing processor d 640 has completed the computing operation performed on the assigned data unit and the first area 646 of the memory 645 of computing processor d 640 stores the operation completion information. Thus, computing processor d 640 may transmit the second operation completion information to the $2^{nd}$ next computing processor, computing processor f 660. Computing processor f 660 may store the received second operation completion information to the second area 667 of the memory 665.

Also, computing processor f 660 has completed the computing operation performed on the assigned data unit and the first area 666 and the second area 667 of the memory 665 of computing processor f 660 store the first and second operation completion information. Thus, computing processor f 660 may transmit the third operation completion information to the $4^{th}$ next computing processor, computing processor d 640. Computing processor d 640 may store the received third operation completion information to the third area 648 of the memory 645.

Figure 7F:
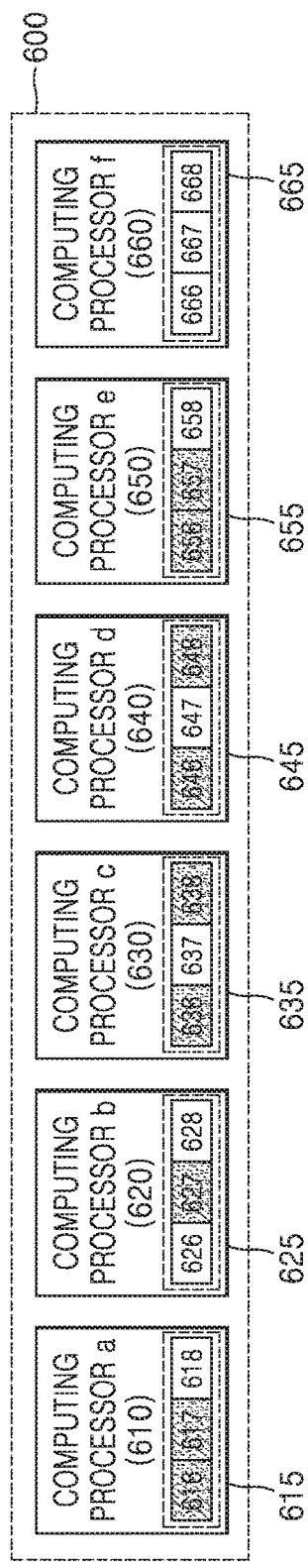

Referring to FIG. 7F, when the computing operation has been completed, computing processor b 620 may transmit the first operation completion information to the next computing processor, computing processor c 630. Computing processor c 630 may store the received first operation completion information to the first area 636 of the memory 635.

Computing processor c 630 has completed the computing operation performed on the assigned data unit and the first area 636 of the memory 635 of computing processor c 630 stores the operation completion information. Thus, computing processor c 630 may transmit the second operation completion information to the $2^{nd}$ next computing processor, computing processor e 650. Computing processor e 650 may store the received second operation completion information to the second area 657 of the memory 655.

Also, computing processor e 650 has completed the computing operation performed on the assigned data unit and the first area 656 and the second area 657 of the memory 655 of computing processor e 650 store the first and second operation completion information. Thus, computing processor e 650 may transmit the third operation completion information to the $4^{th}$ next computing processor, computing processor c 630. Computing processor c 630 may store the received third operation completion information to the third area 638 of the memory 635.

Figure 7G:
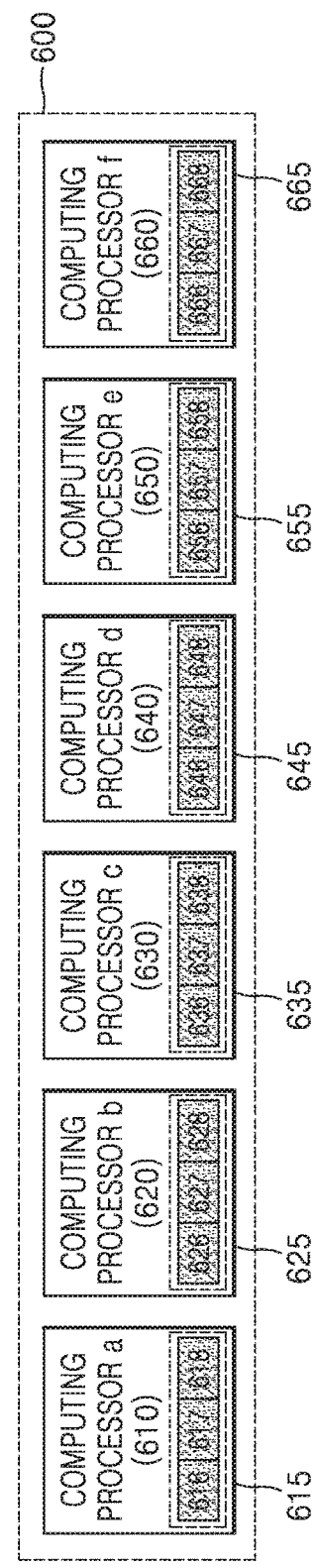

Referring to FIG. 7G, when the computing operation has been completed, computing processor a 610 may transmit the first operation completion information to the next computing processor, computing processor b 620. Computing processor b 620 may store the received first operation completion information to the first area 626 of the memory 625.

Also, computing processor a 610 has completed the computing operation performed on the assigned data unit and the first area 616 and the second area 617 of the memory 615 of computing processor a 610 store the first and second operation completion information. Thus, computing processor a 610 may transmit the second operation completion information to the $2^{nd}$ next computing processor, computing processor c 630. Computing processor c 630 may store the received second operation completion information to the second area 637 of the memory 635.

Also, computing processor a 610 may transmit the third operation completion information to the $4^{th}$ next computing processor, computing processor e 650. Computing processor e 650 may store the received third operation completion information to the third area 658 of the memory 655.

Computing processor b 620 has completed the computing operation performed on the assigned data unit and the first area 626 and the second area 636 of the memory 625 of computing processor b 620 store the first and second operation completion information. Thus, computing processor b 620 may transmit the second operation completion information to the $2^{nd}$ next computing processor, computing processor d 640. Computing processor d 640 may store the received second operation completion information to the second area 647 of the memory 645.

Also, computing processor b 620 may transmit the third operation completion information to the $4^{th}$ next computing processor, computing processor f 660. Computing processor f 660 may store the received third operation completion information to the third area 668 of the memory 665.

Computing processor c 630 has completed the computing operation performed on the assigned data unit and the first area 636 and the second area 637 of the memory 635 of computing processor c 630 store the first and second operation completion information. Thus, computing processor c 630 may transmit the third operation completion information to the $4^{th}$ next computing processor, computing processor a 610. Computing processor a 610 may store the received third operation completion information to the third area 618 of the memory 615.

Computing processor d 640 has completed the computing operation performed on the assigned data unit and the first area 646 and the second area 647 of the memory 645 of computing processor d 640 store the first and second operation completion information. Thus, computing processor d 640 may transmit the third operation completion information to the $4^{th}$ next computing processor, computing processor b 620. Computing processor b 620 may store the received third operation completion information to the third area 628 of the memory 625.

When the computing operation performed on the assigned data, which is the final operation, has been completed by computing processor a 610, the operation completion information may be stored in the areas 616, 617, 618, 626, 627, 628, 636, 637, 638, 646, 647, 648, 656, 657, 658, 666, 667, and 668 of the memories 615, 625, 635, 645, 655, and 665 of all the processors 610, 620, 630, 640, 650, and 660. Each of the computing processors 610, 620, 630, 640, 650, and 660 may identify that the computing operations of the other computing processors have been completed by using the operation completion information stored in each memory 615, 625, 635, 645, 655, or 665.

The multi-core processor 600 according to an embodiment may identify that the operations performed on all the data units partitioned from the multi-media data have been completed, by using the method of transmitting and receiving the operation completion information among the plurality of computing processors 610, 620, 630, 640, 650, and 660 included in the multi-core processor 600.

Figure 8:
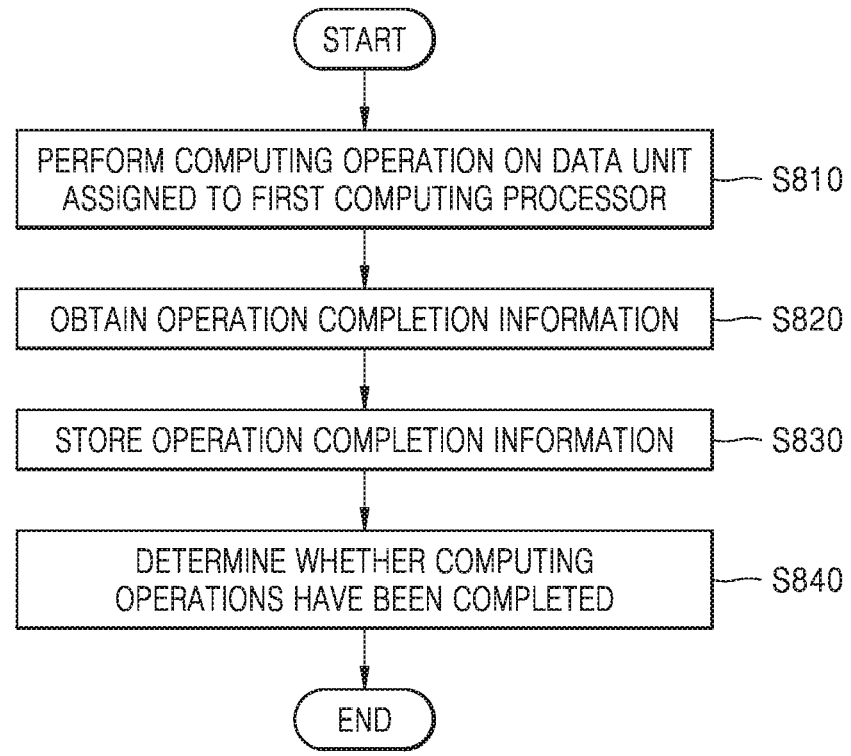
FIG. 8 is a flowchart of an operating method of a computing processor, according to an embodiment.

FIG. 8 is a flowchart of an operating method of the computing processor 110, according to an embodiment.

In operation S810, the computing processor 110 may perform a computing operation on an assigned data unit from among a plurality of data units partitioned from multi-media data.

In operation S820, the computing processor 110 may obtain operation completion information of the computing operation performed on at least one predetermined data unit from the plurality of computing processors 110, 120, 130, and 140. The computing processor 110 may obtain the operation completion information from at least one computing processor (for example, the computing processor 120) predetermined based on a rule determined by the multi-core processor 100.

The rule determined by the multi-core processor 100 may be the same as described with reference to FIGS. 2 and 3.

In operation S830, the computing processor 110 may store the operation completion information obtained from the at least one predetermined computing processor. The operation completion information may include information regarding an area of the memory 115, in which the operation completion information is to be stored. According to the area of the memory 115, in which the operation completion information is stored, the computing processor 110 may determine which computing processors from among the other computing processors 120, 130, and 140 included in the multi-core processor 100 have completed the computing operation.

The computing processor 110 may determine whether the computing operations performed on the multi-media data have been completed, based on the operation completion information obtained from the at least one predetermined computing processor and stored in each area of the memory 115, and the computing operation performed on the assigned data unit.

Figure 9:
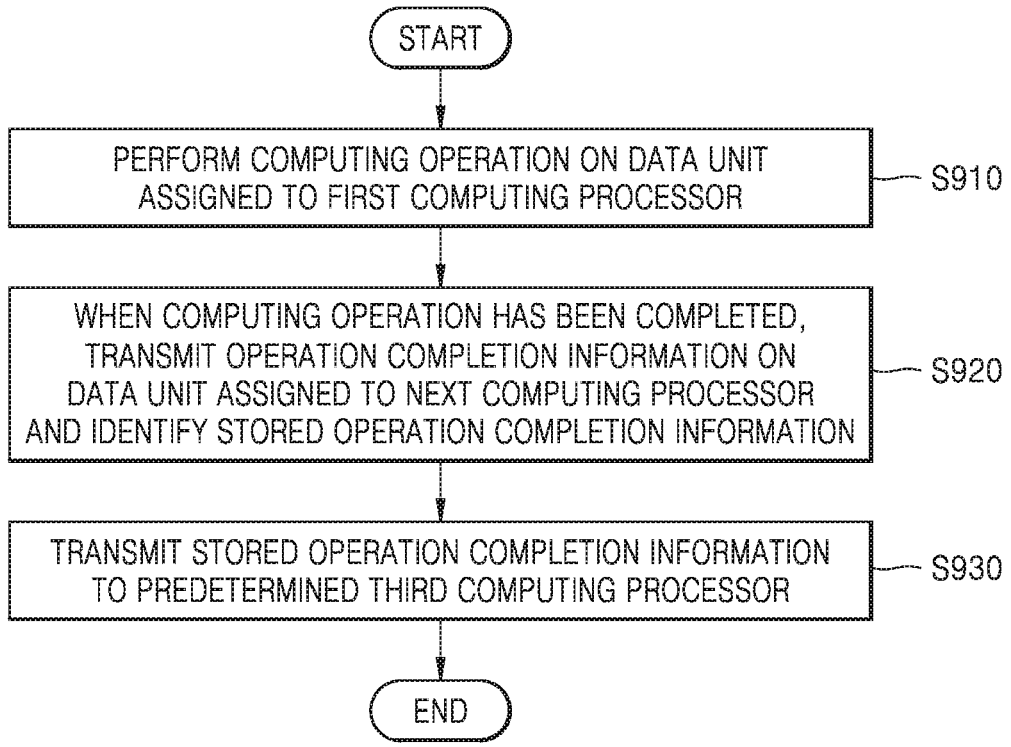
FIG. 9 is a flowchart of a method used by a computing processor to transmit operation completion information, according to an embodiment.

FIG. 9 is a flowchart of a method used by the computing processor 110 to transmit the operation completion information, according to an embodiment.

In operation S910, the computing processor 110 may perform a computing operation on an assigned data unit, from among a plurality of data units partitioned from multi-media data.

Operation S910 may correspond to operation S810 described above with reference to FIG. 8.

In operation S920, when the computing operation performed on the assigned data unit has been completed, the computing processor 110 may transmit the operation completion information on the assigned data unit to the next computing processor. The operation completion information may include identification information indicating the next computing processor and information regarding a location in which the operation completion information is stored.

In operation S930, the computing processor 110 may transmit the stored operation completion information to another predetermined computing processor. For example, the computing processor 110 may generate operation completion information indicating that the operation of the computing processor indicated by the stored operation completion information has been completed, and transmit the generated operation completion information to the other predetermined computing processor. Here, the computing processor 110 may identify the computing processor indicated by the received operation completion information, based on the location in which the received operation completion information is stored. For example, when the received operation completion information is stored in a second area of the memory, the computing processor 110 may identify that the computing operations of the second previous computing processor and the third previous computing processor have been completed.

When the computing processor 110 receives the operation completion information from the $2^{n-1 th}$ previous computing processor and does not receive the operation completion information from the $2^{n-2 th}$ previous computing processor, the computing processor 110 may suspend the transmission of $n^{th}$ operation completion information, until the computing processor 110 receives the operation completion information from the $2^{n-2 th}$ previous computing processor.

The device described herein may include a processor, a memory for storing program data and executing it, a permanent storage such as a disk drive, a communication port for handling communications with external devices, and user interface devices, such as a touch panel, a key, a button etc. Any processes may be implemented as software modules or algorithms, and may be stored as program instructions or computer readable codes executable by a processor on a computer-readable media such as magnetic storage mediums (e.g., read-only memory (ROM), random-access memory (RAM), floppy disks, hard disks, etc.), and optical data read devices (e.g., CD-ROM, digital versatile disc (DVD), etc.). The computer readable recording medium can also be distributed over network coupled computer systems so that the computer readable code is stored and executed in a distributed fashion. This media can be read by the computer, stored in the memory, and executed by the processor.

All documents including the publications, patent applications, patents, etc. cited in the present inventive concept may be incorporated in the present inventive concept as each of the documents is individually and specifically incorporated in the present inventive concept, or as it is, in whole, incorporated in the present inventive concept.

While the present inventive concept has been particularly shown and described with reference to exemplary embodiments thereof, it will be understood by one of ordinary skill in the art that various changes in form and details may be made therein without departing from the spirit and scope of the present inventive concept as defined by the following claims. Hence, it will be understood that the embodiments described above are not limiting of the scope of the invention. For example, each component described in a single type may be executed in a distributed manner, and components described distributed may also be executed in an integrated form.

The scope of the present inventive concept is indicated by the claims rather than by the detailed description of the invention, and it should be understood that the claims and all modifications or modified forms drawn from the concept of the claims are included in the scope of the present inventive concept.

The invention claimed is:

1. An operating method of a first computing processor, the method comprising:
   performing a computing operation on a first data unit assigned from among a plurality of data units that are partitioned from multi-media data;
   transmitting, when the computing operation performed on the assigned first data unit has been completed, operation completion information with respect to the assigned first data unit to a predetermined third computing processor from among the plurality of computing processors;
   obtaining, from at least one second computing processor, independently of operation completion of the assigned first data unit, operation completion information of the computing operation performed on an assigned second data unit, wherein the second computing processor is different from the first computing processor, and wherein the at least one second computing processor is predetermined from among a plurality of computing processors;
   storing the operation completion information obtained from the at least one second computing processor; and
   determining whether computing operations performed on the multi-media data have been completed, based on the operation completion information obtained from the at least one second computing processor and stored, and the computing operation performed on the assigned first data unit.

2. The method of claim 1,
   wherein the storing of the operation completion information comprises, when the operation completion information has been obtained from the at least one second computing processor, entering into a first mode for storing the operation completion information, and
   wherein the determining of whether computing operations performed on the multi-media data have been completed comprises determining whether operation completion information of each of the plurality of computing processors has been received.

3. The method of claim 2, further comprising:
   when the operation completion information is not obtained from the at least one second computing processor, changing from the first mode to a second mode for waiting for the operation completion information from the at least one second computing processor; and
   when the operation completion information is obtained from the at least one second computing processor, entering into the first mode.

4. The method of claim 1, further comprising, when the computing operation performed on the assigned first data unit has been completed, and the operation completion information is obtained from the at least one second computing processor, outputting a result of the computing operations performed on the multi-media data.

5. The method of claim 1, further comprising transmitting the stored operation completion information to the predetermined third computing processor.

6. The method of claim 1, wherein the obtained operation completion information comprises information regarding an area in which the operation completion information is stored.

7. A non-transitory computer-readable recording medium having embodied thereon a program for executing the method of claim 1.

8. The method of claim 1,
   wherein each of the plurality of computing processors including the at least one second computing processor are respectively assigned to a data unit of the plurality of data units that are partitioned from the multi-media data,
   wherein each of the plurality of computing processors including the at least one second computing processor are configured to exchange operation completion information of the computing operation performed on an assigned data unit, and
   wherein the at least one second computing processor is configured to receive the operation completion information from at least one of the remaining plurality of computing processors.

9. The method of claim 8, further comprising:
   obtaining, from at least one second computing processor, operation completion information of the computing operation received by the at least one second computing processor from the at least one of remaining plurality of computing processors.

10. A first computing processor comprising:
    a controller configured to perform a computing operation on a first data unit assigned from among a plurality of data units that are partitioned from multi-media data;
    an operation information transmitter and receiver configured to obtain operation completion information of the computing operation performed on an assigned second data unit, independently of operation completion of the assigned first data unit, from at least one predetermined second computing processor from among a plurality of computing processors, wherein the second computing processor is different from the first computing processor; and a memory configured to store operation completion information obtained from each of the plurality of computing processors, wherein the controller is further configured to determine whether computing operations performed on the multi-media data have been completed, based on the operation completion information obtained from the at least one second computing processor and stored, and the computing operation performed on the assigned first data unit, wherein the operation information transmitter and receiver is further configured to transmit operation completion information with respect to the assigned first data unit to a predetermined third computing processor among the plurality of computing processors, when the computing operation performed on the assigned first data unit has been completed.

11. The first computing processor of claim 10, wherein the controller is further configured to:

enter into a first mode for storing the operation completion information, when the operation completion information has been obtained from the at least one second computing processor, and determine whether operation completion information of each of the plurality of computing processors has been received.

12. The first computing processor of claim 11, wherein the controller is further configured to:

change from the first mode to a second mode for waiting for the operation completion information from the at least one second computing processor, when the operation completion information is not obtained from the at least one second computing processor, and enter into the first mode when the operation completion information is obtained from the at least one second computing processor.

13. The first computing processor of claim 10, further comprising:

a data output unit configured to output a result of the computing operations performed on the multi-media data, when the computing operation performed on the assigned first data unit has been completed and the operation completion information of each of the plurality of computing processors has been obtained; and a data input unit configured to obtain any one of a plurality of data units partitioned from other multi-media data.

14. The first computing processor of claim 10, wherein the operation information transmitter and receiver is further configured to transmit the stored operation completion information to the predetermined third computing processor.

15. The first computing processor of claim 10, wherein the obtained operation completion information comprises information regarding an area of the memory in which the operation completion information is stored.

* * * * *